United States Patent Office 3,050,515
Patented Aug. 21, 1962

3,050,515
WATER-SOLUBLE DISAZO-DYESTUFFS
Raymond Gunst, Binningen, Switzerland, assignor to Ciba Corporation, a corporation of Delaware
No Drawing. Filed Mar. 16, 1959, Ser. No. 799,444
Claims priority, application Switzerland Mar. 24, 1958
9 Claims. (Cl. 260—153)

This invention provides valuable new disazo-dyestuffs, which are suitable for dyeing cellulosic fibrous materials and correspond to the formula (1)        R—N=N—R$_1$—N=N—R$_2$—NH—X in which R and R$_1$ each represent a benzene or naphthalene radical, R$_2$ represents the radical of a naphthalene sulfonic acid bound in the 4-position to the azo linkage and in the 1-position to the —NH— group, and X represents a 2-amino-4-halogen 1:3:5-triazine nucleus which is bound in the 6-position to the —NH— group.

The invention also provides a process for the manufacture of the disazo-dyestuff of the Formula 1, wherein a trihalogen-1:3:5-triazine, an amino-disazo-dyestuff of the formula (2)        R—N=N—R$_1$—N=N—R$_2$—NH$_2$ in which R and R$_1$ each represent a benzene or naphthalene radical, R$_2$ represents the radical of a naphthalene sulfonic acid bound in the 4-position to the azo linkage and in 1-position to the —NH$_2$— group, and ammonia or a primary or secondary organic monamine are condensed in any order of succession in such manner that a monohalogen-triazine condensation product is formed.

The starting materials of the Formula 2 can be obtained by coupling a diazotized amino-monoazo-dyestuff with a 1-aminonaphthalene sulfonic acid capable of coupling in the 4-position. As such 1-aminonaphthalene sulfonic acids there are used more especially those that are free from hydroxyl groups, for example, 1-aminonaphthalene-8-sulfonic acid, 2-methoxy-1-aminonaphthalene-6-sulfonic acid and above all 1-aminonaphthalene-6-sulfonic acid and 1-aminonaphthalene-7-sulfonic acid.

The diazo-components to be coupled with the aforesaid coupling components must contain, in addition to the diazotizable amino group, an azo linkage and at least one sulfonic acid group. Apart from the sulfonic acid group, they may contain further substituents imparting solubility in water, for example, carboxyl groups, or substituents not imparting solubility in water. It will be apparent that there are used for making the dyestuffs of the Formula 2 as diazo-components amino-azo-dyestuffs obtainable by coupling one of the aforesaid 1-aminonaphthalene sulfonic acids or an amine of the benzene series, for example, the ω-methane sulfonic acid derivative of aniline, of ortho-methoxy-aniline or of ortho-carboxy-aminobenzene (the ω-methane sulfonic acid being split off by hydrolysis in order to liberate the amino group after the dyestuff has been made), and also meta-toluidine, 3-acetylamino-1-aminobenzene, 3 - ureido-1-aminobenzene, 1-amino-2-methyl-5-methoxybenzene, 1-amino-2:5-dimethoxy- or diethoxy-benzene, 1-amino-3-methoxybenzene, 1-amino-2-methoxy - 5 - isopropylbenzene, or 1-amino-2:5-dimethylbenzene, with a diazo-compound of the benzene or naphthalene series, for example, with diazotized 1-aminobenzene-2-, -3- or -4-sulfonic acid,
2-amino-1-methoxybenzene-4-sulfonic acid,
1-amino-4-methoxybenzene-2-sulfonic acid,
3-amino-2-hydroxybenzoic acid-5-sulfonic acid,
5-amino-2-hydroxybenzoic acid-3-sulfonic acid,
2-aminophenol-4-sulfonic acid,
2-aminobenzoic acid-4- or -5-sulfonic acid,
1-aminonaphthalene-5- or -6-monosulfonic adic,
2-aminonaphthalene-4-, -6- or -7-sulfonic acid,
1-aminonaphthalene-3:6-disulfonic acid,
2-aminonaphthalene-4:8- or -6:8-disulfonic acid.

For making the dyestuffs of the Formula 2 used as starting materials in the process of the invention there may also be used diazo-components containing an azo linkage, which are obtained by sulfonating an azo-dyestuff which contains a diazotizable amino group or a substituent convertible into such a group after the sulfonation, for example, a nitro group or an R—CO—NH— group, in which R represents an aryl radical. As such dyestuffs there may be mentioned, for example, amino-monoazo-dyestuffs obtainable by the sulfonation, for example, of amino-azobenzene, 4 - amino - 4' - methoxy-azobenzene, amino-azonaphthalene or phenyl-azo-naphthylamine.

The amino-monoazo-dyestuffs used for making the dyestuffs of the Formula 2 can be diazotized by methods in themselves known, for example, with the use of a mineral acid, especially hydrochloric acid, and sodium nitrite. The coupling of the diazo-compounds so obtained with the aforesaid 1-aminonaphthalene sulfonic acids capable of coupling in the 4-position, can also be carried out by methods in themselves known.

The condensation of the finished dyestuffs with a cyanuric trihalide is advantageously carried out in the presence of an acid-binding agent, such as sodium acetate or sodium carbonate.

The dyestuffs of this invention can be obtained by exchanging in a dihalogen-triazine dyestuff obtained from a cyanuric halide one of the halogen atoms by reaction with ammonia or a primary or secondary amine, advantageously containing less than 13 carbon atoms. As such amines there may be mentioned, for example, methylamine, dimethylamine, ethylamine, diethylamine, propylamine, isopropylamine, butylamine, isobutylamine, hexyl- or cyclohexylamine, and also β-chlorethylamine, piperidine, morpholine, γ-methoxy-propylamine, methoxyethylamine, ethanolamine, propanolamine, aniline, ortho-, meta- or para-chloro or -methyl- or -methoxy-aniline, hydrazine, thiosemicarbazine and toluene sulfonic acid amide; and also glycine, aminocarbonic acid esters such as the methyl or ethyl ester, aminoacetic acid ethyl ester, aminoacetamide and especially 1-aminobenzene-2:5-disulfonic acid, 1-aminobenzene-2-, -3- or -4-sulfonic acid, aminoaphthalene mono- or disulfonic acid, aminodiphenyl sulfonic acid. As amines there may also be used amino-dyestuffs, for example, amino-monoazo-dyestuffs, amino-azobenzene mono- or di-sulfonic acid, amino-thioxanthone sulfonic acids, aminoacridones and especially amino-anthraquinone sulfonic acids, such as 1-amino-4-(4'-aminophenylamino)-anthraquinone-2:3'-, -2:4'- or -2:5- and/or -2:8-disulfonic acids.

The condensation of the above amino-compounds with dihalogen-triazine dyestuffs is advantageously carried out with the use of an acid-binding agent, such as sodium acetate, sodium carbonate or sodium hydroxide, and under conditions such that the final product contains an exchangeable halogen atom, that is to say, for example in an organic solvent or in an aqueous medium at a relatively low temperature.

In making the dyestuffs of this invention by the condensation of one of the aforesaid amino-disazo-dyestuffs with cyanuric chloride and one of the simpler amino-compounds mentioned above it is generally possible to carry out the condensation in any order of succession.

The resulting dyestuffs are preferably isolated at as a low temperature as possible by salting out and filtration. The filtered dyestuffs may be dried, if desired, after the addition of an extender and/or a buffer, such as a mixture of equal parts of monosodium and disodium phosphate. The drying is advantageously carried out at not too high a temperature and under reduced pressure. By spray drying the reaction mixture in which the dyestuff is formed, it is in some cases possible to obtain dry preparations directly, that is to say, without intermediate isolation of the dyestuff.

The new dyestuffs are suitable for dyeing or printing a very wide variety of materials, especially cellulosic fibrous materials, such as linen, regenerated cellulose and above all cotton. They are especially suitable for dyeing by the direct dyeing method from relatively dilute baths and by the so-called pad dyeing process, in which the goods are impregnated with an aqueous solution of the dyestuff, may contain a salt, and the dyestuff is fixed on the fiber, that is to say, caused to react with the fiber, by treatment with an alkali at a raised temperature. This process and the direct dyeing method, which can be used with many of the dyestuffs of the invention, yield valuable dyeings that are fixed fast to washing, and by the printing method fast prints are obtained.

In order to improve the properties of wet fastness, the dyeings or prints so obtained may be thoroughly rinsed with cold and hot water, if desired, with the addition of an agent having a dispersing action and assisting diffusion of the non-fixed dyestuff.

The dyeings produced with the new dyestuffs on polyhydroxylated, especially cellulosic, fibers are usually distinguished by their good fastness to light and above all by their excellent fastness to washing.

The following examples illustrate the invention, the parts being by weight:

*Example 1*

A suspension of 18.6 parts of finely dispersed cyanuric chloride in 300 parts of ice and 200 parts of ice water is treated with a solution of the disazo dyestuff obtained by coupling the diazo compound from 1-amino-4-acetyl-aminobenzene-2-sulfonic acid with 1-amino-2-methoxy-5-methylbenzene, further diazotizing the resulting amino-monoazo compound, and coupling it with 1-aminonaphthalene-6-sulfonic acid in 500 parts of water at pH=8.5. The temperature is maintained at 10° C. The pH value is maintained between 9 and 7 by adding alkali. After 1 hour the condensation is complete. This mixture is treated with a solution of 17.3 parts of 1-aminobenzene-3-sulfonic acid in 250 parts of water, heated to 40° C. and the pH value is maintained at about 7 by the dropwise addition of alkali. After 2 hours the condensation is complete. The pH is adjusted to 8, and the dyestuff is salted out with sodium chloride, filtered off and dried. The dyestuff obtained in this manner dyes cotton fast, reddish brown tints.

A dyestuff having similar properties is obtained when the above-specified 18.6 parts of cyanuric chloride are replaced by 32 parts of cyanuric bromide.

*Example 2*

A suspension of 18.6 parts of finely dispersed cyanuric chloride in 300 parts of ice and 200 parts of ice water is treated with a solution of 68.5 parts of the amino-disazo dyestuff obtained by coupling the diazo compound from 2-aminonaphthalene-4:8-disulfonic acid with 1-amino-2-methoxy-5-methylbenzene, further diazotizing the resulting amino-monoazo dyestuff and coupling it with 1-aminonaphthalene-6-sulfonic acid in 500 parts of water. The temperature is maintained at 10° C. The pH value is maintained between 7 and 9 by adding alkali dropwise. After 1 hour a solution of 17.3 parts of 1-aminobenzene-3-sulfonic acid in 250 parts of water is added. The whole is raised to 40° C. and the pH value is maintained at about 7 by the dropwise addition of alkali. After 2 hours the condensation is complete. The pH value is adjusted to 8, and the dyestuff formed filtered off and dried; it dyes cotton fast violetish brown tints.

A dyestuff having similar properties is obtained by using 32 parts of cyanuric bromide instead of 18.6 parts of cyanuric chloride as described above.

*Example 3*

A suspension of 18.6 parts of finely dispersed cyanuric chloride in 300 parts of ice and 200 parts of ice water is treated with a solution of 59.1 parts of the intermediate compound obtained in known manner by coupling diazotized 4 - amino - 1:1' - azobenzene - 3:4' - disulfonic acid with 1-aminonaphthalene-6-sulfonic acid, in 500 parts of water at pH=8.5. The temperature is maintained at 10° C. By the dropwise addition of alkali the pH is advantageously maintained at 7 to 9. The condensation is complete after 1 hour. The reaction mixture is then mixed with a solution of 17.3 parts of 1-aminobenzene-3-sulfonic acid in 250 parts of water. The temperature is raised to 35 to 40° C. while maintaining the pH at about 7 by the suitable dropwise addition of alkali. After 2 hours the condensation is complete. The whole is then adjusted to a pH of 8, the dyestuff formed is salted out with sodium chloride, filtered off and dried. The dyestuff isolated in this manner dyes cotton fast, orange brown tints.

When the 17.3 parts of 1-aminobenzene-3-sulfonic acid are replaced by an equivalent amount of aniline or ammonia, dyestuffs are obtained which have similar properties.

*Example 4*

A suspension of 18.6 parts of finely dispersed cyanuric chloride in 300 parts of ice and 200 parts of ice water is treated with a solution of 67.1 parts of the aminodisazo dyestuff obtained by coupling the diazo compound from 1-aminobenzene-4-sulfonic acid with 1-amino-2-naphthol-methyl ether-6-sulfonic acid, further diazotizing the resulting amino-monoazo dyestuff and coupling it with 1-aminonaphthalene-6-sulfonic acid, in 500 parts of water. The temperature is maintained at 10° C. The pH value is maintained between 7 and 9. After 2 hours, 200 parts of 2 N-ammonia are added, the whole is stirred for 4 hours at 40° C., and the dyestuff is precipitated with sodium chloride, filtered off and dried. The dyestuff obtained in this manner dyes cellulose fibers from an alkaline bath containing sodium chloride violetish brown tints which are fast to washing and light.

*Example 5*

A suspension of 18.6 parts of finely dispersed cyanuric chloride in 300 parts of ice and 200 parts of ice water is treated with a solution of 77.1 parts of the amino-disazo dyestuff obtained by coupling the diazo compound from 2-aminonaphthalene-4:8-disulfonic acid with 1-aminonaphthalene-6-sulfonic acid, further diazotizing the resulting amino dyestuff and coupling it with 1-aminonaphthalene-6-sulfonic acid, in 500 parts of water. The temperature is maintained at 10° C. and the pH value between 8 and 6. After 2 hours, 300 parts of 2 N-ammonia are added, the whole is stirred for 4 hours at 40° C., and the dyestuff is isolated and dried. From an alkaline bath it dyes cotton reddish brown tints which are fast to washing and light.

A dyestuff having similar properties is obtained by using 32 parts of cyanuric bromide instead of 18.6 parts of cyanuric chloride as specified above.

When 2-aminonaphthalene-4:8-disulfonic acid, used above as first diazo component, is replaced by 1-aminonaphthalene-6-sulfonic acid, a dyestuff is obtained which likewise produces reddish brown tints and has similar properties.

*Example 6*

A suspension of 18.6 parts of finely dispersed cyanuric chloride in 300 parts of ice and 200 parts of ice water is treated with a solution of 69.1 parts of the aminodisazo dyestuff obtained by coupling the diazo compound from 1-aminonaphthalene-6-sulfonic acid with 1-aminonaphthalene-6-sulfonic acid, further diazotizing and coupling with 1-aminonaphthalene-7-sulfonic acid, in 500 parts of water.

Temperature: 10° C.; pH=9 to 7. After 2 hours, 300 parts of 2 N-ammonia are added, the whole is stirred for 4 hours at 40° C., and the dyestuff formed is separated and dried. The new dyestuff obtained in this manner dyes cotton from an alkaline, salted bath fast reddish brown tints.

The exchange of the second chlorine atom in the triazine residue may be carried out with a primary or secondary aliphatic or aromatic amine instead of with ammonia. In the examples described above, the following amines may replace ammonia: methylamine, dimethylamine, ethanolamine or morpholine. The resulting dyestuffs likewise dye reddish brown tints and have very similar properties.

*Example 7*

A solution prepared from 20.2 parts of 1:3-diamino-2-methylbenene-5-sulfonic acid and 5.3 parts of sodium carbonate in 200 parts of water is mixed with 13.8 parts of sodium nitrite, and the whole is poured into a mixture of 50 parts of hydrochloric acid of 30% strength and 200 parts of ice. The tetrazo compound formed is mixed with a neutral solution of 44.6 parts of 1-aminonaphthalene-6-sulfonic acid in 400 parts of water. Temperature: 10° C.; pH=3.2. After 24 hours the pH is adjusted to 7, and the whole is poured into a suspension of 37.2 parts of cyanuric chloride in 600 parts of ice and 400 parts of ice water. The temperature is maintained at 10° C. and the pH at 6 to 8. After 1 hour, 400 parts of 2 N-ammonia are added, the whole is stirred for 4 hours at 40° C., and the dyestuff is separated and dried. From an alkaline dyebath it dyes yellowish brown tints which are fast to washing.

In making the dyestuff described above, 1-aminonaphthalene-6-sulfonic acid may be replaced by a mixture of equal parts of 1-aminonaphthalene-6-sulfonic acid and 1-aminonaphthalene-7-sulfonic acid; the resulting dyestuff has similar properties.

A similar dyestuff is obtained by using 1-amino-2-naphthol methyl ether-6-sulfonic acid instead of 1-aminonaphthalene-6-sulfonic acid.

*Example 8*

A suspension of 18.6 parts of finely dispersed cyanuric chloride in 300 parts of ice and 200 parts of ice water is treated with a solution of 59.1 parts of the aminodisazo dyestuff obtained by coupling the diazo compound from 4-amino-1:1'-azobenzene-3:4'-disulfonic acid with 1-aminonaphthalene-6-sulfonic acid, in 500 parts of water; the whole is condensed for 1 hour as described in Example 1, then mixed with a neutral solution of 48.9 parts of 1-amino - 4 - (4' - aminophenylamino) - anthraquinone-2:3'-disulfonic acid in 500 parts of water, and stirred for 48 hours at 40° C. and a pH value of 6 to 8. The dyestuff formed is separated and dried.

The dyestuff obtained in this manner dyes cellulose fibers by the so-called pad-dyeing method very fast khaki tints.

When the blue aminoanthraquinone dyestuff used for the second condensation in the above example is replaced by the yellow 4-amino-1-phenylamino-thioxanthone-X'-sulfonic acid (39.8 parts), a dyestuff is obtained which produces yellowish brown tints which are very fast to light.

A dyestuff which likewise dyes yellowish brown tints is obtained when the second condensation with cyanuric chloride is carried out with 25.7 parts of 4-amino-4'-hydroxy-3'-carboxy-1:1'-azobenzene.

*Example 9*

2 parts of the dyestuff prepared as described in the first paragraph of Example 3 are dissolved in 100 parts of water. A cotton fabric is impregnated with this solution at 60 to 80° C. on a padder, and the excess liquor is squeezed off until the fabric retains 75% of dye liquor calculated from its own weight.

The impregnated material is dried and then impregnated at room temperature in a solution which contains per liter 10 parts of sodium hydroxide and 300 parts of sodium chloride, squeezed to a weight increase of 75%, steamed for 60 seconds at 100 to 101° C., rinsed, treated in a sodium bicarbonate solution of 0.5% strength, rinsed, soaped for 15 minutes in a boiling solution of 0.3% strength of a non-ionic detergent, rinsed and dried. An orange brown dyeing is obtained which is fast to washing and light.

*Example 10*

2 parts of the dyestuff prepared as described in Example 1 are dissolved in 100 parts of water by being raised to the boil for a short time. The stock solution thus obtained is added to 2900 parts of water at 20° C. 30 parts of trisodium phosphate and 60 parts of sodium chloride are added, 100 parts of cotton are immersed in this bath, the temperature is raised to 80° C. within 45 minutes, 60 parts of sodium chloride are added, and dyeing is carried out for 30 minutes at 90 to 95° C. The dyeing is then rinsed, treated for 15 minutes in a boiling solution containing per liter 2 grams of sodium carbonate and 3 grams of soap, rinsed and dried. A strong reddish brown dyeing is obtained.

What is claimed is:

1. A water-soluble disazo dyestuff of the formula

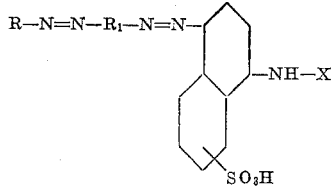

wherein R is sulfoaryl, the aryl of the sulfoaryl being a hydrocarbon of the series $C_{4n+2}H_{2n+3}$ in which $n$ is a positive whole number of at most 2; $R_1$ is arylene of the series $C_{4m+2}H_{2m+2}$ in which $m$ is a positive whole number of at most 2, bound in the 1:4 positions to the azo linkages; and X is a 2-amino-4-halogen-1:3:5-triazine nucleus which is bound in the 6-position to the —NH— group, the halogen having an atomic number from 17 to 35, inclusive.

2. A water-soluble disazo-dyestuff of the formula

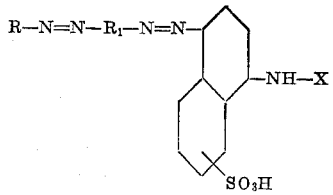

in which R represents a member selected from the group consisting of a sulfophenyl- and a sulfonaphthyl-radical, $R_1$ represents a member selected from the group consisting of the phenylene and the naphthylene radicals bound in the 1:4-positions to the azo linkages, and X represents a 2-amino-4-chloro-1:3:5-triazine nucleus which is bound in the 6-position to the —NH— group.

3. A water-soluble disazo dyestuff of the formula

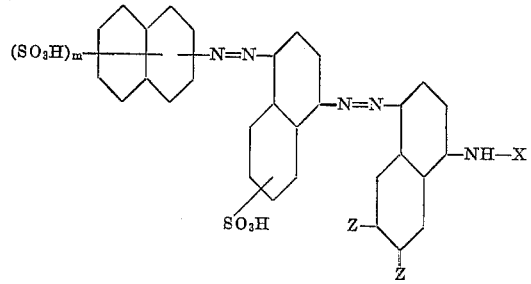

wherein $m$ represents a whole positive number up to 2, one Z represents a hydrogen atom and the other Z a sulfonic acid group, and X represents the radical of a 4-amino-2-chloro-1:3:5-triazine, which is bound in the 6-position to the —NH— group.

4. A water-soluble disazo-dyestuff of the formula

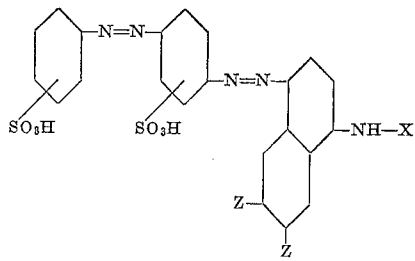

wherein one Z represents a hydrogen atom and the other Z a sulfonic acid group, and X represents the radical of a 4-amino-2-chloro-1:3:5-triazine, which is bound in the 6-position to the —NH— group.

5. The water-soluble disazo-dyestuff of the formula

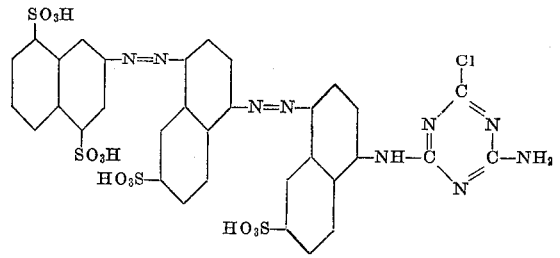

6. The water-soluble disazo-dyestuff of the formula

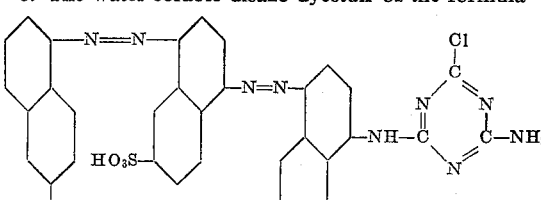

7. The water-soluble disazo-dyestuff of the formula

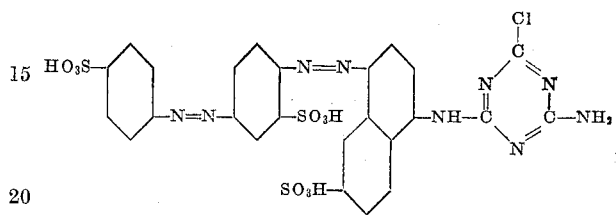

8. The water-soluble disazo-dyestuff of the formula

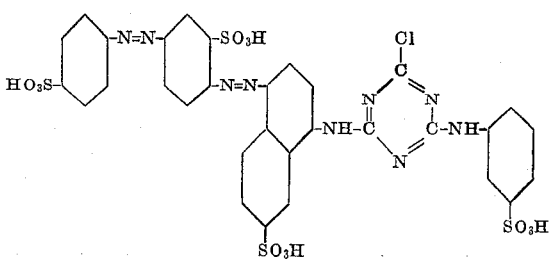

9. The water-soluble disazo-dyestuff of the formula

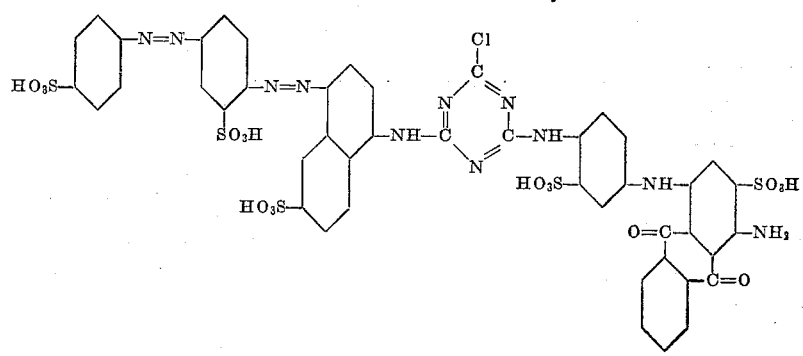

References Cited in the file of this patent
UNITED STATES PATENTS

| | | |
|---|---|---|
| 2,167,804 | Gubler et al. | Aug. 1, 1939 |
| 2,891,941 | Fasciati et al. | June 23, 1959 |
| 2,892,671 | Alsberg et al. | June 30, 1959 |